US009469068B2

(12) United States Patent
Owens

(10) Patent No.: US 9,469,068 B2
(45) Date of Patent: Oct. 18, 2016

(54) MICROWAVE DRIVEN DIFFUSION OF DIELECTRIC NANO- AND MICRO-PARTICLES INTO ORGANIC POLYMERS

(71) Applicant: Government of the United States as Represented by the Secretary of the Air Force, Washington, DC (US)

(72) Inventor: Jeffery R. Owens, Panama City, FL (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 157 days.

(21) Appl. No.: 14/210,738

(22) Filed: Mar. 14, 2014

(65) Prior Publication Data

US 2014/0272189 A1  Sep. 18, 2014

Related U.S. Application Data

(60) Provisional application No. 61/786,923, filed on Mar. 15, 2013.

(51) Int. Cl.
*B29C 65/14* (2006.01)
*D06M 10/00* (2006.01)
*H01B 3/30* (2006.01)
*H01B 3/44* (2006.01)
(Continued)

(52) U.S. Cl.
CPC ........ *B29C 65/1425* (2013.01); *D06M 10/003* (2013.01); *D06M 10/06* (2013.01); *H01B 3/305* (2013.01); *H01B 3/441* (2013.01); *H01B 3/445* (2013.01); *H01B 3/50* (2013.01)

(58) Field of Classification Search
CPC ................................................. B23C 65/1425
See application file for complete search history.

(56) References Cited

U.S. PATENT DOCUMENTS 5,072,087 A    12/1991  Apte et al.
5,338,611 A *  8/1994   Lause ................. B29C 65/1425
                                                    156/272.2
(Continued)

FOREIGN PATENT DOCUMENTS

JP    2005-038687    2/2005
WO    2009073348    6/2009

OTHER PUBLICATIONS

Xie et al. Aligned Carbon Nanotube Coating on Polyetheylene Surface Formed by Microwave Radiation. Composites Science and Technology 72 (2011) pp. 85-90.*

(Continued)

*Primary Examiner* — Dah-Wei D. Yuan
*Assistant Examiner* — Jose Hernandez-Diaz
(74) *Attorney, Agent, or Firm* — AFMCLO/JAZ; Chastity Whitaker

(57) ABSTRACT

A method of doping a substrate with dielectric dopant particles. The substrate, comprising an organic polymer, is exposed to a first layer comprising a first plurality of dielectric dopant particles. The organic polymer has a thermal conductivity that is less than 5 $Wm^{-1}K^{-1}$ and a lossiness that is less than a lossiness of the first plurality of dielectric dopant particles. The substrate and first layer are irradiated by an energy source operating at an operating frequency. During the irradiation, the first plurality of dielectric dopant particles of the first layer diffuses into the organic polymer of the substrate. Irradiation continues for a first desired time to achieve a first desired depth of penetration of the first plurality of dielectric dopant particles into the organic polymer.

8 Claims, 9 Drawing Sheets

(51) Int. Cl.
*H01B 3/50* (2006.01)
*D06M 10/06* (2006.01)

(56) References Cited

U.S. PATENT DOCUMENTS

| | | | |
|---|---|---|---|
| 5,851,319 | A | 12/1998 | Atwater et al. |
| 6,316,123 | B1 | 11/2001 | Lee et al. |
| 6,350,973 | B2 | 2/2002 | Wroe et al. |
| 6,512,216 | B2 | 1/2003 | Gedevanishvili et al. |
| 6,554,924 | B2 | 4/2003 | Morrow et al. |
| 6,809,305 | B2 | 10/2004 | Barmatz et al. |
| 7,171,919 | B2 | 2/2007 | Sohn et al. |
| 7,541,561 | B2 | 6/2009 | Thyssen et al. |
| 8,518,206 | B2 * | 8/2013 | Wang ................ B82Y 40/00 156/272.2 |
| 2001/0004075 | A1 | 6/2001 | Wroe et al. |
| 2003/0129392 | A1 | 7/2003 | Abuto |
| 2003/0209539 | A1 | 11/2003 | Dalton |
| 2004/0238794 | A1 | 12/2004 | Karandikar et al. |
| 2008/0138533 | A1 | 6/2008 | Borneman et al. |
| 2008/0145566 | A1 | 6/2008 | Cretegny et al. |
| 2010/0264356 | A1 * | 10/2010 | Cook ................ B29C 35/0805 252/62.54 |

OTHER PUBLICATIONS

European Patent Office, International Search Report and Written Opinion of the International Searching Authority, mailed Nov. 3, 2014, 18 pages total.

European Patent Office, "Partial International Search Report," mailed Jun. 16, 2014, 7 pages total.

H. R. Hakimelahi et al., "Synthesis and characterization of transparent alumina reinforced polycarbonate nanocomposite," Polymer, vol. 51 (2010) 2494-2502.

Patent Abstracts of Japan Machine Translation, "Japanese Application Publication No. 2005-038687," filed Jul. 14, 2003, http://www19.ipdl.inpit.go.jp/PA1/cgi-bin/PA1DETAIL, accessed Jun. 23, 2014, 22 pages total.

Macdiarmid, "Synthetic metals: a novel role for organic polymers (Nobel Lecture)," Angew. Chem. Int. Ed., vol. 40 (2001) 2581-2590.

National Materials Advisory Board, "Microwave processing of materials," published by the National Research Council (1994) 162 pages total.

MacDiarmid, "Synthetic metals: a novel role for organic polymers," Synthetic Metals, vol. 125 (2002) 11-22.

Xie et al, "Aligned carbon nanotube coating on polyethylene surface formed by microwave radiation," Comp. Sci. Tech., vol. 72 (2011) 85-90.

Shin et al., "Enhanced specific heat capacity of nanomaterials synthesized by dispersing silic nanoparticles in eutectic mixtures," J. Heat Transfer, vol. 135 (2013) 8 pages total.

European Patent Office, International Preliminary Report on Patentability in corresponding International Patent Application No. PCT/GB2014/050794, mailed Nov. 3, 2014.

* cited by examiner

†: 100 μm resolution; ‡: 20 μm resolution

MICROWAVE DRIVEN DIFFUSION OF DIELECTRIC NANO- AND MICRO-PARTICLES INTO ORGANIC POLYMERS

Pursuant to 37 C.F.R. §1.78(a)(4), this application claims the benefit of and priority to prior filed Provisional application Ser. No. 61/786,923, filed Mar. 15, 2013, and International Application Ser. No. PCT/GB2014/050794, filed on even date herewith. The disclosure of each is expressly incorporated herein by reference, in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to the microwave treatment of materials and, more particularly, to the microwave treatment of organic polymer materials with dielectric nanomaterials.

BACKGROUND OF THE INVENTION

Organic polymers are conventionally considered to be electrical insulators or semiconductors. However, doping of organic polymers changes the electrical, electronic, magnetic, or optical properties of the polymer while retaining advantages of the polymer, such as, mechanical strength and flexibility.

Conventional methods for doping organic polymers having included adding the dopant to melted organic polymer, such as in melt spinning or injection molding; dissolving the organic polymer, adding the dopant, and evaporating off the solvent, such as electrospun fibers and solvent cast films; and adding dopants with precursors and polymerize the organic polymer in the presence of the particles. The latter method being particularly useful for polymers such as urethanes, polyurea resins, and acrylic resins.

However, these conventional methods do not sufficiently control a depth or distribution of the dopant particles in the organic polymers. Furthermore, these methods are limited to the time of polymer manufacture. Thus, there remains a need for improved methods of doping organic polymers after manufacture while controlling the depth and/or distribution of the dopant in the polymer.

SUMMARY OF THE INVENTION

The present invention overcomes the foregoing problems and other shortcomings, drawbacks, and challenges of doping organic polymers after manufacture. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a method of doping a substrate with dielectric dopant particles includes exposing the substrate, comprising an organic polymer, to a first layer comprising a first plurality of dielectric dopant particles. The organic polymer has a thermal conductivity that is less than 5 $Wm^{-1}K^{-1}$ and a lossiness that is less than a lossiness of the first plurality of dielectric dopant particles. The substrate and first layer are irradiated by an energy source operating at an operating frequency. During the irradiation, the first plurality of dielectric dopant particles of the first layer diffuses into the organic polymer of the substrate. Irradiation continues for a first desired time to achieve a first desired depth of penetration of the first plurality of dielectric dopant particles into the organic polymer.

Yet another embodiment of the present invention is directed to a method of doping a substrate with first and second pluralities of dopant particles and includes exposing the substrate, comprising an organic polymer, to a first layer comprising the first plurality of dielectric dopant particles. The organic polymer has a thermal conductivity that is less than 5 $Wm^{-1}K^{-1}$ and a lossiness that is less than a lossiness of the first plurality of dielectric dopant particles. The substrate and first layer are irradiated by an energy source operating at an operating frequency. During the irradiation, the first plurality of dielectric dopant particles of the first layer diffuses into the organic polymer of the substrate. Irradiation continues for a first desired time to achieve a first desired depth of penetration of the first plurality of dielectric dopant particles into the organic polymer. The substrate is exposed to a second layer comprising the second plurality of dielectric dopant particles, wherein the lossiness of the organic polymer of the substrate is less than a lossiness of the second plurality of dielectric dopant particles. The substrate and second layer are irradiated by an energy source operating at an operating frequency. During the irradiation, the second plurality of dielectric dopant particles of the second layer diffuses into the organic polymer of the substrate. Irradiation continues for a second desired time to achieve a second desired depth of penetration of the second plurality of dielectric dopant particles into the organic polymer.

Still another embodiment of the present invention is directed to a method of doping a substrate with dielectric dopant particles includes exposing the substrate, comprising an organic polymer, to a first layer comprising a first plurality of dielectric dopant particles. The organic polymer has a thermal conductivity that is less than 5 $Wm^{-1}K^{-1}$ and the first plurality of dielectric dopant particles has a melting temperature that is greater than about 300° C. The substrate and first layer are irradiated by an energy source operating at an operating frequency. During the irradiation, the first plurality of dielectric dopant particles of the first layer diffuses into the organic polymer of the substrate. Irradiation continues for a first desired time to achieve a first desired depth of penetration of the first plurality of dielectric dopant particles into the organic polymer.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
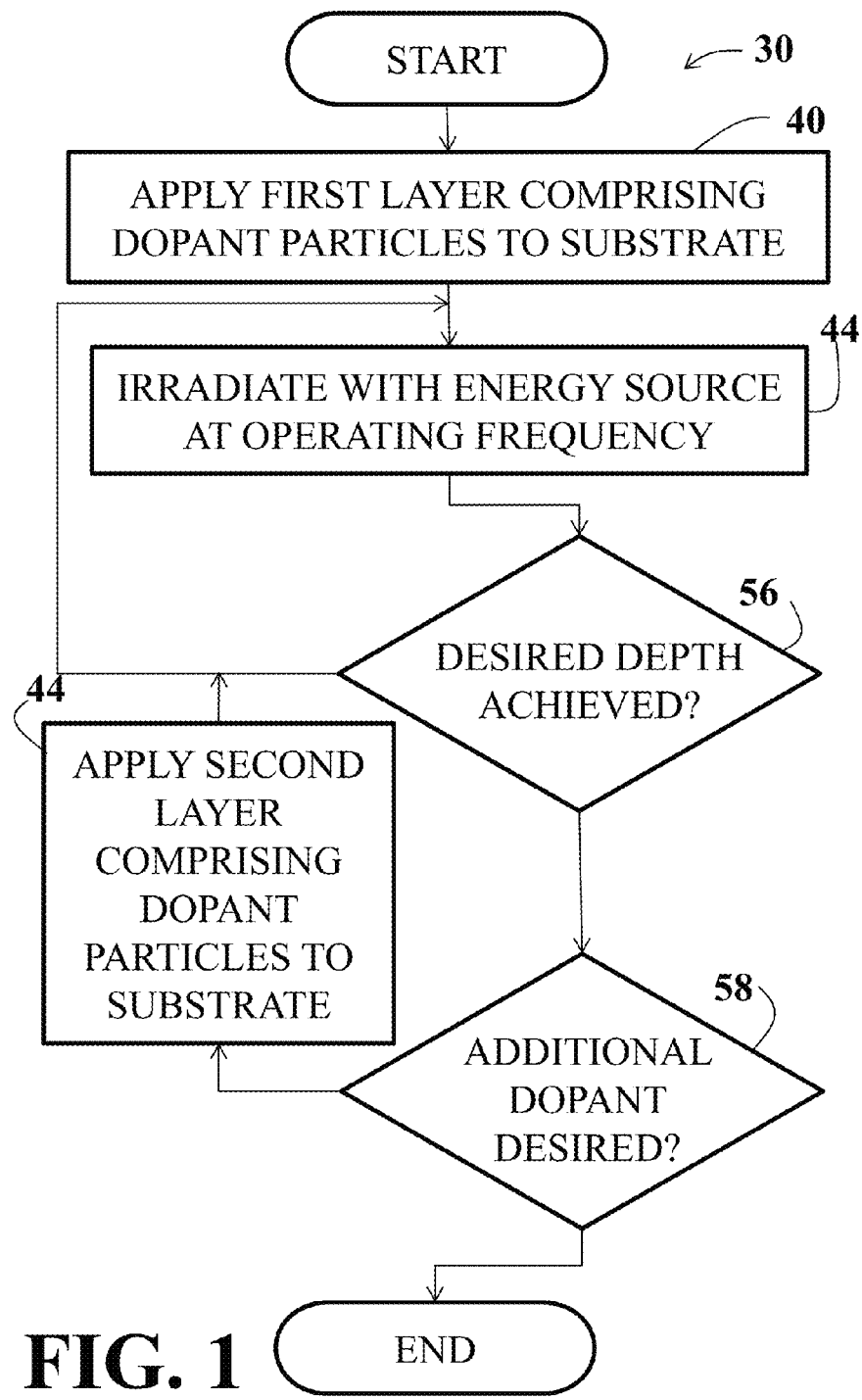
FIG. 1 is a flowchart illustrating a method of doping an organic polymer with particles in accordance with one embodiment of the present invention.

Turning now to the figures, and in particular to FIG. 1, a flowchart 30 showing a method of driving dopant particles into a polymer using microwave energy according to an embodiment of the present invention is shown. In that regard, and with additional reference to FIG. 2, a substrate 32 comprising a plurality of polymerized monomers 34 is shown in cross-section. The substrate 32 may be any organic polymer having a melting point that is generally lower than the melting point of the dopant particles. Suitable organic polymers may include, but are not limited to, polypropylene ("PP"), polyethylene ("PE"), nylon, aramids, polytetrafluoroethylene ("PTFE"). The substrate 32 may be, for example, a solid disc.

Figure 2:
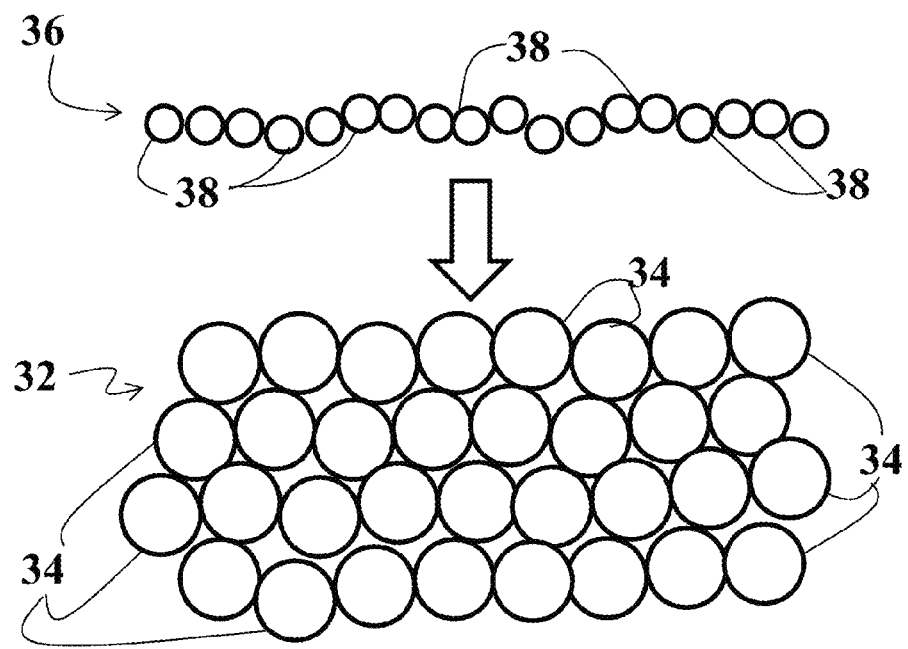
FIGS. 2-8 are schematic representations of an embodiment of the method illustrated in the flowchart of FIG. 1.

Also shown in FIG. 2 is a first layer 36, comprising a plurality of dopant particles 38, which is positioned above the substrate 32. The dopant particles 38 comprising the first layer 36 may include any heat high melting (melting point temperature of at least 300° C.), lossy, dielectric nano- or micro-particle having a diameter ranging from about 30 nm to about 5000 nm. Suitable dopant particles 38 may include, but are not limited to, oxides, hydroxides, nitrides, and carbides of silicon, iron, titanium, zirconium, nickel, cobalt, and boron.

Generally, selection of a material comprising the substrate 10 should be made such that a thermal conductivity (k) of the organic polymer material is less than 5 $Wm^{-1}K^{-1}$ and is less lossy (e.g., causing less dissipation of electrical energy) at an operating frequency (described below) than a lossiness of the dopant particles 38 comprising the first layer 36.

Figure 3:
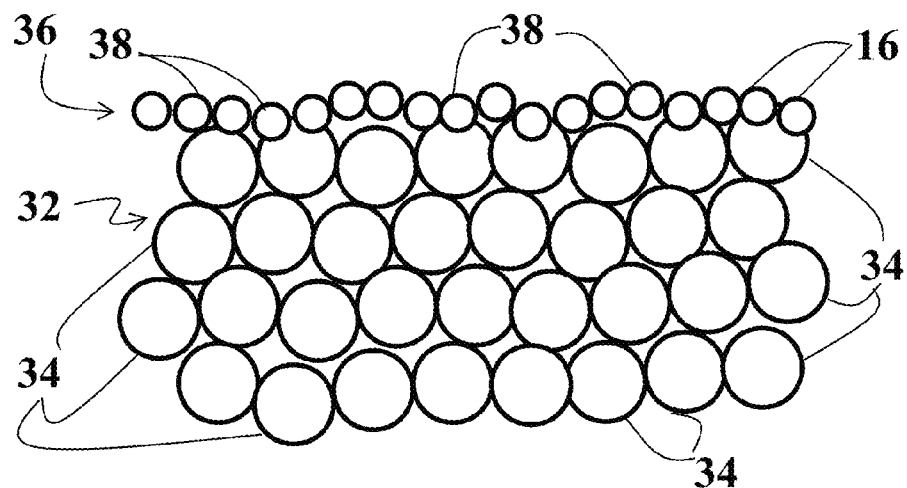

In Block 40 of FIG. 1, the first layer 36 is applied, or positioned adjacent, to the substrate 32 such that the dopant particles 34 are adjacent to and in contact with a surface of the substrate 32, as shown in FIG. 3.

Figure 4:
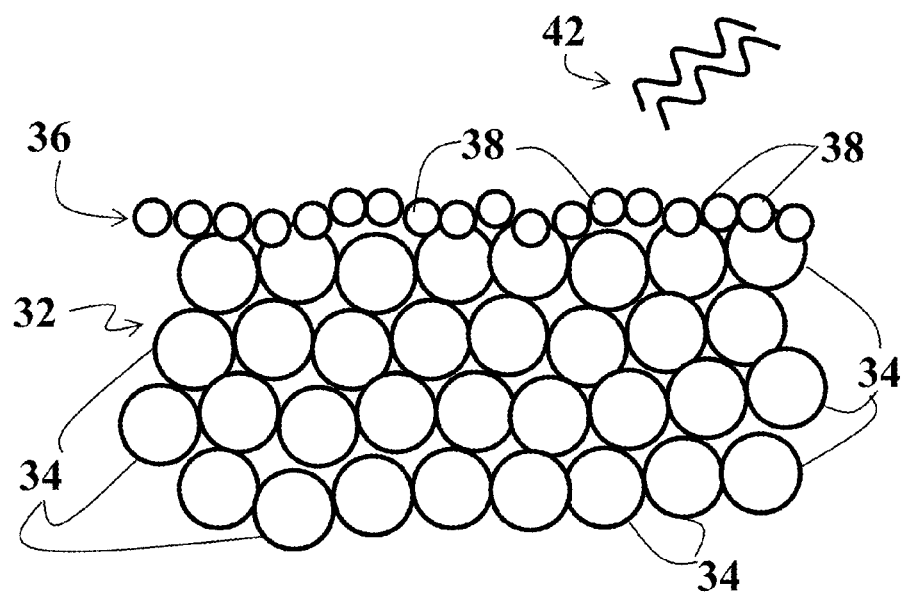

With the first layer 36 applied to the substrate 32, and as shown in FIG. 4, the dopant particles 38 and the substrate 32 are irradiated with energy (illustrated as wavelengths 42) characterized by the operating frequency (Block 44). While the operating frequency may vary, frequencies within the microwave range of the electromagnetic spectrum provide additional features, as provided in detail below. Still more particular, the operating frequency may range from about 2 GHz to about 3 GHz and, indeed, may be generated by a 2.45 GHz mixed mode magnetron.

Figure 9:
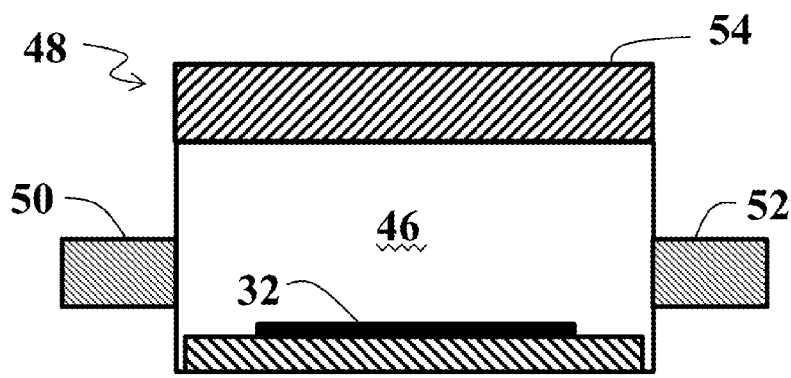
FIG. 9 is a schematic representation of an exemplary multi-mode microwave processing chamber that is suitable for use with a method of doping an organic polymer with particles in accordance with an embodiment of the present invention.

In that regard, the substrate 32 with the first layer 36 thereon may be placed within a processing cavity 46 of a processing chamber 48, one embodiment of which is shown in FIG. 9. The processing cavity 46 may be operably coupled to at least one magnetron (first and second magnetrons 50, 52 are shown) for exposing the substrate 32 and the first layer 36 to the operating frequency generated by the first and second magnetrons 50, 52. A dielectric window lid 54 may close off the processing cavity 46 and reduce exposure or escape of radiation.

While wishing to not bound by theory, it is believed that irradiating the substrate 32 with energy having an operating frequency of about 2.45 GHz transfers energy to the substrate 32 at least one of a plurality of ways. Energy may be transferred via ionic conduction, wherein charged species attempt to align with the electric side of the electromagnetic field and, in doing so, generates heat by molecular friction. Energy may additionally or alternatively be transferred by dipole polarization, wherein polar species attempt to align with the electric side of the electromagnetic field and, in doing so, generates heat by molecular friction. Additionally or alternatively still, energy may be transferred by Ohmic or resistive heating, wherein the electric side of the electromagnetic field generates an electrical current in conductive material and, in doing so, generates heat by electrical resistance. Additionally or alternatively still, energy may be transferred by magnetic heating, wherein ferromagnetic materials, when exposed to the magnetic side of the electromagnetic field, generate heat. Energy may transferred by interfacial (Maxwell-Wagner) heating, wherein contacting materials having different dielectric materials are exposed electromagnetic field.

Efficiency of energy transfer within a dielectric material may be expressed as a loss tangent, or tan δ, which may depend, at least in part, on an effective permittivity, a relative permittivity, and a complex permittivity of the dielectric material. Generally, dielectric materials having high dielectric constants will have a high tan δ value and will heat more efficiently when exposed to energy of microwave frequencies. However, the dielectric constant is temperature-dependent and, in solids, increases with temperature. The temperature-related increase of the dielectric constant gives rise to thermal runaway, which is a phenomenon by which the tan δ of the dielectric material increases as the dielectric material is heated. The thermal runaway phenomenon is primarily limited to solids because the dielectric constants of liquids and gases tend to decrease with increased temperature.

Figure 5:
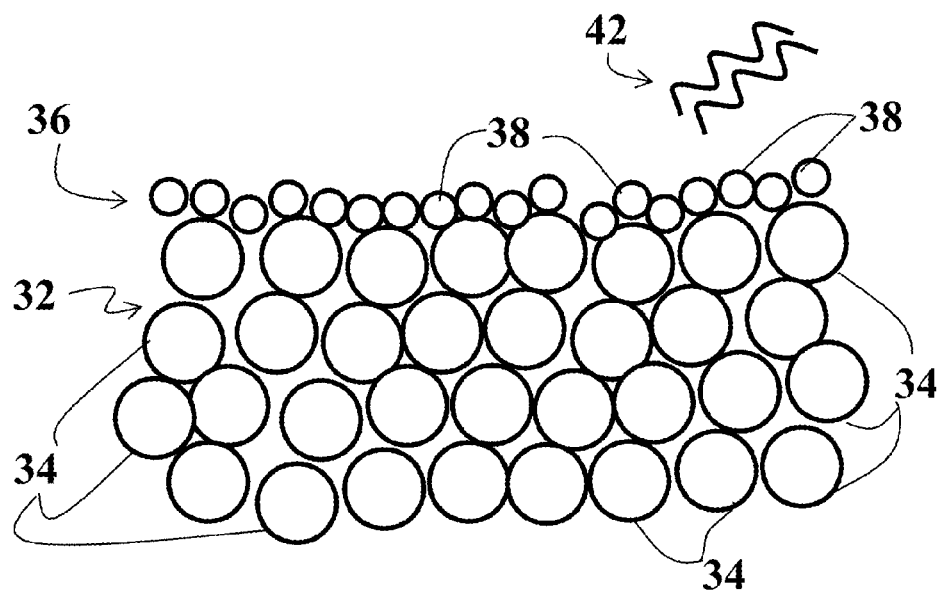

Referring again to FIGS. 1 and 4, because the dopant particles 38 comprising the first layer 36 have a low mass, the dopant particles 38 may quickly reach a thermal runaway temperature upon heating. The substrate 32, having a relatively low thermal conductivity, experiences a rate of conversion of microwave energy to heat that is greater than a rate of thermal diffusion away. The low thermal conductivity of the substrate 32 with the small size of the dopant particles 38 is important to prevent deterioration of the physical properties of the substrate 32. Resultantly, a localized portion of the substrate 32, proximate the first layer 36, melts, as shown in FIG. 5.

Figure 6:
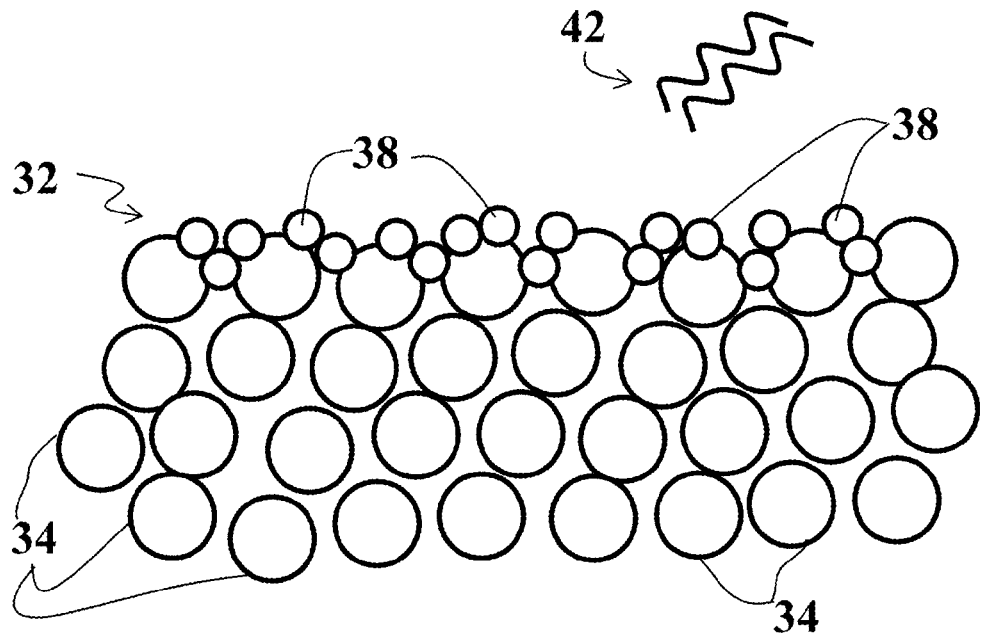
Figure 7:
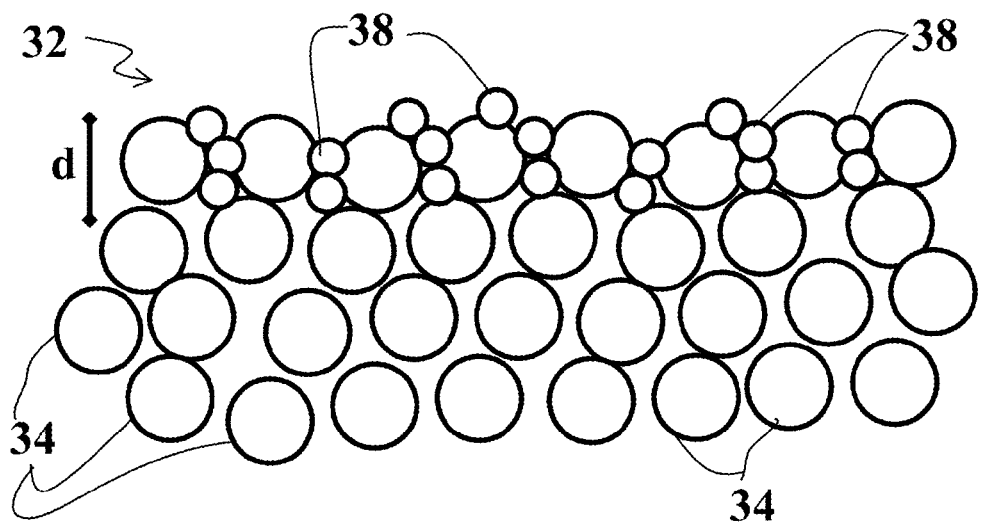
Figure 8:
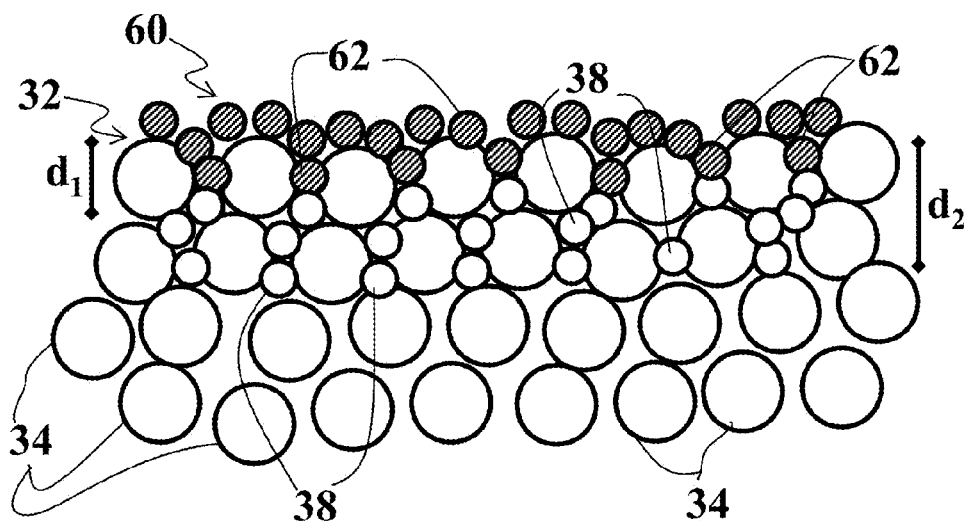

In FIGS. 6 and 7, and as the portion of the substrate 32 proximate the first layer 36 melts, the dopant particles 38 diffuse into the substrate 32 (that is, between the polymerized monomers 34) via Brownian motion, i.e., via random movement. If the size dimensions, the mass, or both of the dopant particles 38 is too great, then Brownian motion will not carry the dopant particles 38 into the substrate 32. Instead, diffusion would occur by gravity and would be unidirectional.

Referring again to FIG. 1, and now also to FIG. 7, in Block 56, a determination as to whether a desired depth, d, is achieved is made. The desired depth may be a distance over which the dopant particles 38 diffuse into the locally melted material comprising the substrate 32. The diffusion depth may be related to a value describing how far electromagnetic radiation penetrates into the material before transferring energy to the surrounding material. The penetration depth of some materials, for example, some plastic and crystalline solids, is sufficiently high that the material is considered to be transparent to electromagnetic radiation at a given frequency. By comparison, lossy materials tend to have low penetration depth, wherein the penetration depth of water at room temperature is 6.6 cm at 2.45 GHz. Generally, the desired depth may be a function of an irradiation time.

If the desired depth is not achieved ("No" branch of decision block 56), irradiating with the energy source continues until the desired depth is achieved ("Yes" branch of decision block 56).

With the desired depth achieved, a determination as to whether an additional dopant is desired or needed is made (Block 58). For example, according to some embodiments of the invention, penetration of conductive dopants comprising the first layer into a conductive substrate may be used to block absorption of the electromagnetic radiation farther into the substrate. In any event, if no additional dopant is desired or needed ("No" branch of decision block 58), then the process ends. Otherwise ("Yes" branch of decision block 58), then a second layer 60 comprising a plurality of dopant parties 62 may be applied to the substrate 32 (Block 64) and the process returns for irradiating the substrate 32 with the second layer 60 (Block 44). Irradiation of the substrate 32 and second layer 60 may proceed until desired depths (d1 and d2) are achieved. Dopant particle 38, 62 comprising the first and second layers 36, 60 may have the same composition according to some embodiments of the present invention; however, similar composition is not required. Moreover, the depth of penetration of dopant particles 38, 62 comprising the first and second layers 36, 60 into the substrate 32 may vary, for example, forming a gradient. Such variability depends on the materials comprising the substrate 32, the dopant particles 38, 62, the operating frequency, and the exposure time. With extended exposure time one or more of mechanical strength, surface energy/wettability, flammability, electromagnetic absorption profile, thermal conductivity, of the substrate 32 may increase surface energy/wettability, flammability, EM absorption profile, thermal conductivity, and dielectric properties may be optimized. According to the embodiments of the present invention, substrates 32 may be rendered fire retardant, EM shielding, offer ballistic protection, and so forth.

Figure 10:
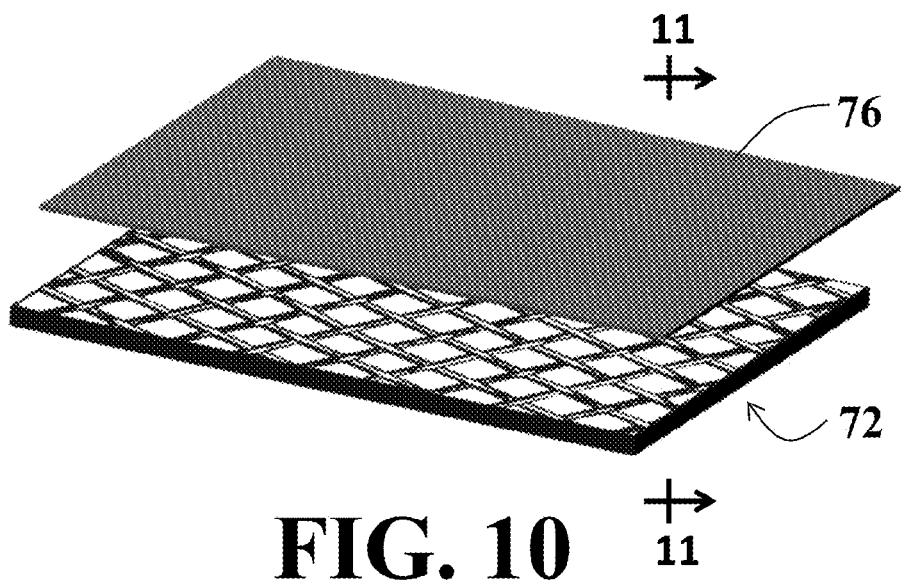
FIG. 10 is an exploded view of a woven having a layer of particles thereon for doping the woven with the particles comprising the layer according to an embodiment of the present invention.
Figure 11:
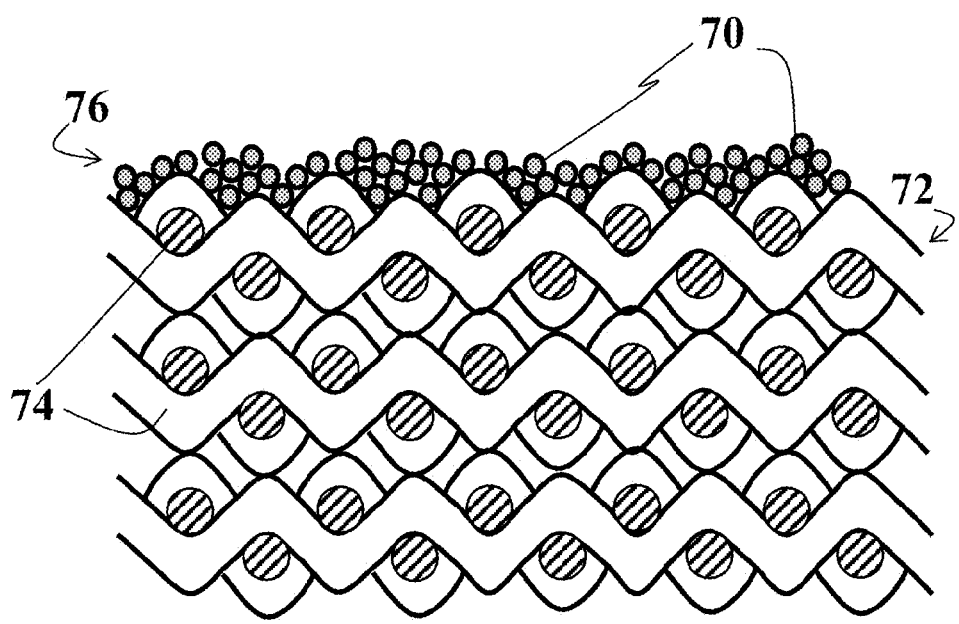
FIGS. 11-12 are schematic representations of an embodiment of the method of doping the woven of FIG. 10 in accordance with an embodiment of the method illustrated in the flowchart of FIG. 1.
Figure 12:
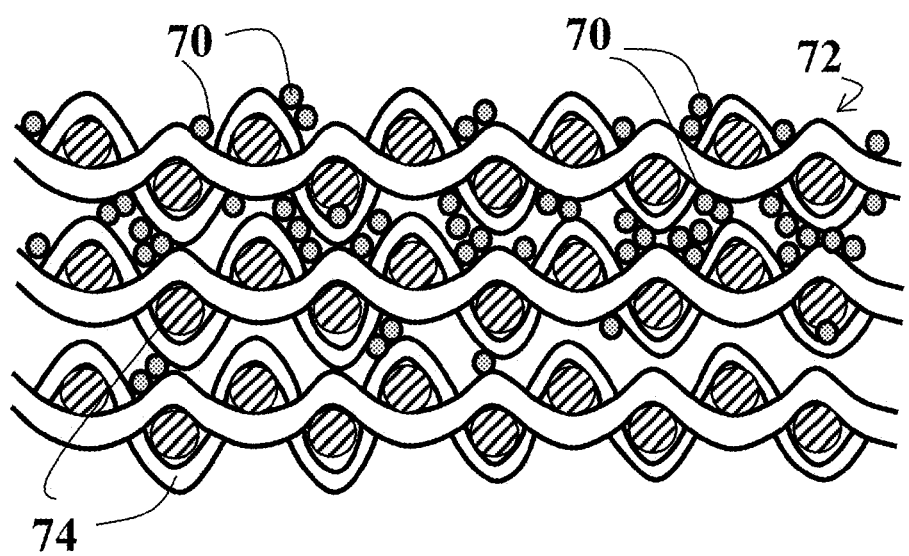

According to another embodiment of the present invention, and as schematically illustrated in FIGS. 10-12, dielectric nano- and micro-particles 70 may be driven into a substrate 72 comprising a woven or a nonwoven of organic filaments 74, as described above. The nano- and micro-particles 70 comprise a first layer 76, and may be constructed of any heat high melting (melting point temperature of at least 300° C.), lossy, dielectric material, having a diameter ranging from about 30 nm to about 5000 nm. Suitable dopant particles 70 may include, but are not limited to, oxides, hydroxides, nitrides, and carbides of silicon, iron, titanium, zirconium, nickel, cobalt, and boron.

In FIG. 11, the first layer 76 is layered onto or place in contact with a surface of the substrate 72, such as was described above with respect to FIGS. 1 and 2. In FIG. 12, and with exposing the substrate 62 and the first layer 76 to radiation at the operating frequency, a localized portion of the substrate 62, proximate the first layer 76, melts, and particles 70 penetrate into the substrate, to a desired depth based, at least in part, on an irradiation time, selected material comprising the substrate 62 and particles 70, and the operating frequency.

EXAMPLE

The following illustrates particular properties and advantages of some of the embodiments of the present invention. Furthermore, this is an example of reduction to practice of the present invention and confirmation that the principles described in the present invention are therefore valid but should not be construed as in any way limiting the scope of the invention.

Boehmite alumina nanowhiskers were placed on each of a plurality of disks, each disk being constructed of a different plastic material, including, nylon, PTFE, PE, and PP. The boehmite alumina nanowhiskers and disks were irradiating at 2.45 GHz for 60 sec in a custom-built 3 kW (three 1 kW magnetron inputs) multi-mode microwave processing chamber having a dielectric window lid covering a processing space and integrated mode-stirrers therein to ensure uniform field distribution.

Figure 13A:
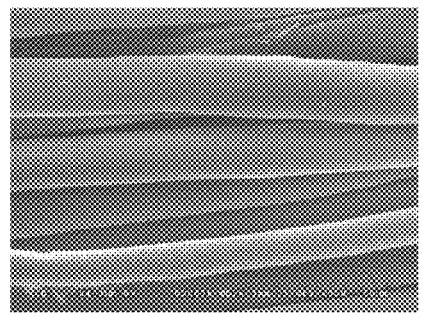
FIGS. 13A and 13B are electron microscope images of untreated NyCo fibers.
Figure 13B:
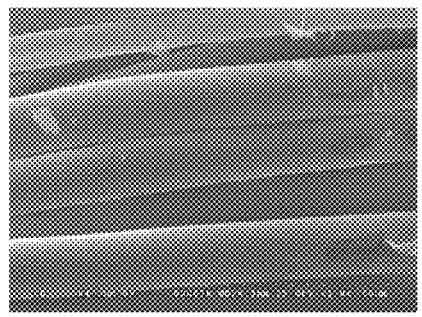
Figure 14A:
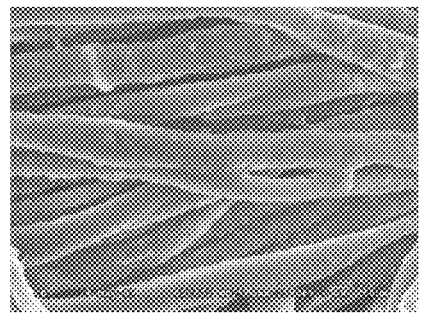
FIGS. 14A and 14B are electron microscope images of NyCo fibers, treated with magnesium hydroxide nano-platelets in accordance with an embodiment of the present invention.
Figure 14B:
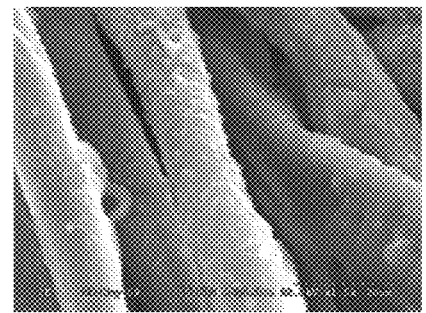

Magnesium hydroxide nano-platelets were successfully diffused into nylon textile fibers by dip treating untreated NyCo fibers (FIGS. 13A and 13B) with a 100% $Mg(OH)_2$ nano-platelet slurry and curing according to the an exemplary process consistent with the method described in FIG. 1. Before treatment, the NyCo fibers were smooth with random impurities, were dip treated. The treated NyCo fibers are shown in FIGS. 14A and 14B.

Figure 15:
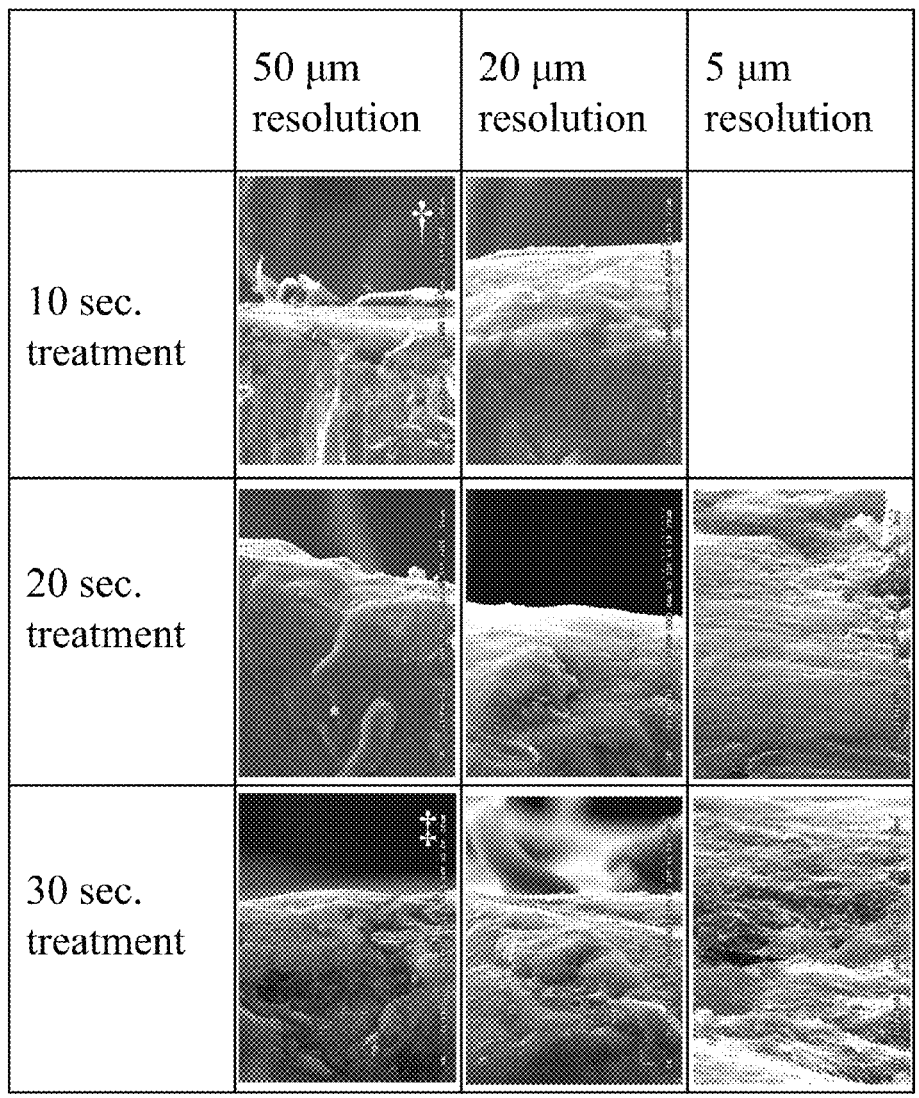
FIG. 15 includes exemplary electron microscope images, at varying resolutions, of NyCo fibers treated with magnesium hydroxide nano-platelets according to embodiments of the present invention for 10 sec, 20 sec, and 30 sec, shown in a tabular format.

FIG. 15 illustrates the surface results of variably treated fibers (10 sec, 20 sec, and 30 sec) at 50 µm, 20 µm, and 5 µm resolutions.

Using the methods described with reference to FIGS. 13A-15, oxides, nitrides, hydroxides, and carbides have been successfully driven into polymeric substrates having varying molecular weights and crystallinities.

According to various embodiments herein, methods of treating organic polymer substrates with dopant particles are described. The methods do not require the substrate or dopant particles to be exposed to heating during manufacture, which minimizes a thermal history of the substrate.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of doping a substrate with first and second pluralities of dopant particles, the method comprising:

exposing the substrate comprising an organic polymer to a first layer comprising a first plurality of dopant particles, wherein a thermal conductivity of the organic polymer is less than 5 $Wm^{-1}K^{-1}$ and a lossiness that is less than a lossiness of the first plurality of dopant particles;

irradiating the substrate and the first layer to an energy source operating at an operating frequency such that the first plurality of dopant particles of the first layer diffuse into the organic polymer of the substrate;

continuing the irradiating for a first desired time to achieve a first depth of penetration of the first plurality of dopant particles into the organic polymer;

exposing the substrate to a second layer comprising a second plurality of dielectric dopant particles, wherein the lossiness organic polymer that is less than a lossiness of the second plurality of dopant particles;

irradiating the substrate and the second layer to an energy source operating at the operating frequency such that the second plurality of dopant particles of the second layer diffuse into the organic polymer of the substrate; and continuing the irradiating for a second desired time such that, the second plurality of particles, having a composition that is different from a composition of particles of the first plurality achieve a second depth of penetration that is different from the first depth of penetration.

2. The method of claim 1, wherein, while continuing irradiating the substrate and the second layer, the first plurality of dopant particles achieves a third desired depth of penetration.

3. The method of claim 1, wherein each of the first and second pluralities of dopant particles has a melting point temperature that is greater than a melting point temperature of the organic polymer comprising the substrate.

4. The method of claim 3, wherein the melting point temperature of the first and second plurality of dopant particles is at least 300° C.

5. The method of claim 1, wherein the operating frequency ranges from about 2 GHz to about 3 GHz.

6. The method of claim 1, wherein the organic polymer is polypropylene, polyethylene, nylon, aramids, polytetrafluoroethylene, or a combination thereof.

7. The method of claim 1, wherein each of the first and second pluralities of dopant particles has a diameter ranging from about 300 nm to about 5000 nm.

8. The method of claim 1, wherein a composition of each of the first and second pluralities of dopant particles is separately selected from an oxide, a hydroxide, a nitride, a carbide of silicon, iron, titanium, zirconium, nickel, cobalt, boron, or a combination thereof.

* * * * *